United States Patent
Nakayama et al.

(10) Patent No.: US 7,667,139 B2
(45) Date of Patent: Feb. 23, 2010

(54) RADIATION-RESISTANT NON-HALOGEN FLAME-RETARDANT RESIN COMPOSITION AS WELL AS ELECTRIC WIRE AND CABLE USING SAME

(75) Inventors: Akinari Nakayama, Hitachi (JP); Masami Sorimachi, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/155,478

(22) Filed: Jun. 5, 2008

(65) Prior Publication Data

US 2009/0114417 A1    May 7, 2009

(30) Foreign Application Priority Data

Jun. 8, 2007    (JP) .............................. 2007-152341

(51) Int. Cl.
    *H01B 3/44* (2006.01)
(52) U.S. Cl. .............................. 174/110 SR; 174/121 A
(58) Field of Classification Search ............. 174/110 R, 174/121 A
    See application file for complete search history.

(56) References Cited

U.S. PATENT DOCUMENTS 5,650,205 A * 7/1997 Shukushima ............... 428/35.8
2004/0147674 A1 * 7/2004 Kakeda et al. .............. 525/88
2005/0004292 A1   1/2005 Harashina et al.
2007/0149680 A1 * 6/2007 Kim et al. .................. 524/436

FOREIGN PATENT DOCUMENTS

| JP | 01-128313 | 5/1989 |
| JP | 05-081936 | 4/1993 |
| JP | 07-179682 | 7/1995 |
| JP | 2000-281837 | 10/2000 |
| JP | 2001-345022 | 12/2001 |
| JP | 2002-302574 | 10/2002 |
| WO | WO 03/046085 A1 | 6/2003 |

\* cited by examiner

*Primary Examiner*—Chau N Nguyen
(74) *Attorney, Agent, or Firm*—Antonelli, Terry, Stout & Kraus, LLP.

(57) ABSTRACT

An electric wire and cable according to the present invention comprises a sheath made of a radiation-resistant non-halogen flame-retardant resin composition in which the radiation-resistant non-halogen flame-retardant resin composition includes one to 30 parts by weight of aromatic amine antioxidant with a melting point of 40° C. or higher and 50 to 300 parts by weight of metal hydroxide blended into 100 parts by weight of ethylene polymer.

9 Claims, 3 Drawing Sheets

RADIATION-RESISTANT NON-HALOGEN FLAME-RETARDANT RESIN COMPOSITION AS WELL AS ELECTRIC WIRE AND CABLE USING SAME

CLAIM OF PRIORITY

The present application claims priority from Japanese patent application Ser. no. 2007-152341 filed on Jun. 8, 2007, the content of which is hereby incorporated by reference into this application.

BACKGROUND OF THE INVENTION

1. Field of the Invention

The present invention relates to a radiation-resistant non-halogen flame-retardant resin composition which can be used in an environment exposed to radiation such as a particle accelerator facility, nuclear power plant, or nuclear reprocessing facility. Furthermore, the present invention relates to an electric wire and cable that uses the resin composition.

2. Description of Related Art

Ionizing radiation including gamma rays is present in a beam line peripheral equipment in a particle accelerator facility, a nuclear power plant, a fast breeder reactor, and a nuclear reprocessing facility. For this reason, electric wires and cables used to supply electric power or transmit signals to these sites must withstand deterioration due to ionizing radiation (see, e.g., JP-A Hei 7 (1995)-179682 and JP-A Hei 1 (1989)-128313).

From the viewpoints of safety in case of a fire and protection of environments, electric wires and cables have been required to be non-halogen electric wires and cables which do not include halogen elements including chlorine and nor do they generate harmful gases when they are burnt (see, e.g., JP-A-2002-302574, JP-A-2001-345022, WO2003-046085, JP-A-2000-281837, and JP-A Hei 5 (1993)-81936). In response to this requirement, electric wires and cables covered with flame-retardant materials, which are stipulated in JIS C 3605 and JIS C 3401, have been widely used in buildings in recent years. Here, it means that flame-retardant materials are non-halogen resin compositions produced by blending soft ethylene polymer such as ethylene ethyl acrylate (EEA), ethylene-vinyl acetate (EVA) copolymer, or ethylene α-olefin copolymer with a metal hydroxide-based flame retardant such as magnesium hydroxide.

However, the main component of the resin composition used for the above electric wires and cables covered with flame-retardant materials is ethylene polymer, as described above. When these electric wires and cables are exposed to ionizing radiation even at room temperature, they excessively deteriorate and cannot be used in a radiation environment typified by particle accelerator facilities and nuclear power facilities.

This is because ethylene polymer exposed to ionizing radiation undergoes oxidative deterioration and thereby main chain scission and cross linkage progress, significantly reducing flame retardancy and mechanical properties including elongation and tensile strength. Furthermore, when electrical wires and cables are deteriorated, their sheaths are prone to crack. Safety in case of a fire is lowered.

SUMMARY OF THE INVENTION

Under these circumstances, it is an objective of the present invention to provide a non-halogen flame-retardant resin composition superior in radiation resistance. Furthermore, it is another objective of the present invention to provide an electric wire and cable which use the resin composition. To address the above problem, various additives to ethylene polymer, which were used to prevent radiation deterioration, were systematically studied, resulting in the present invention described below.

According to one aspect of the present invention, a radiation-resistant non-halogen flame-retardant resin composition comprises one to 30 parts by weight of aromatic amine antioxidant with a melting point of 40° C. or higher and 50 to 300 parts by weight of metal hydroxide blended into 100 parts by weight of ethylene polymer.

In the above aspect, the following modifications and changes can be made.

(i) The aromatic amine antioxidant is a quinoline antioxidant or a phenylenediamine antioxidant.

(ii) Thirty parts or less by weight of mercapto compound is further blended into said 100 parts by weight of ethylene polymer.

(iii) Aromatic process oil is further blended.

(iv) The ethylene polymer is an ethylene-acrylic ester copolymer.

(v) An electric wire comprises the radiation-resistant non-halogen flame-retardant resin composition as an insulating material.

(vi) A cable comprises the radiation-resistant non-halogen flame-retardant resin composition as a sheath material.

Advantages Of The Invention

The present invention can provide a non-halogen flame-retardant resin composition superior in radiation resistance as well as an electric wire and cable which use the resin composition.

The radiation-resistant non-halogen flame-retardant resin composition in the present invention does not generate a harmful gas when it is burnt. Even when the resin composition is used in an ionizing radiation environment, its mechanical properties do not decrease so much. When the resin composition is used for an insulation or sheath of an electric wire and cable, they do not generate a harmful gas during usage and have increased radiation resistance.

DETAILED DESCRIPTION OF THE PREFERRED EMBODIMENTS

Figure 1:
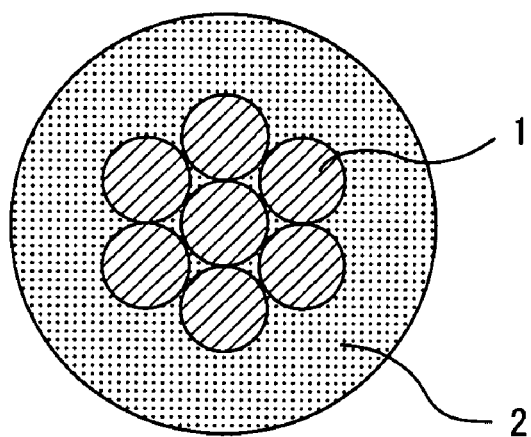
FIG. 1 is a schematic illustration showing a cross-sectional view of an exemplary electric wire to which the present invention is applied.

A preferred embodiment of the present invention will be described below in detail. However, the present invention is not limited to the embodiment described herein.

In a radiation-resistant non-halogen flame-retardant resin composition according to the present invention, one to 30 parts by weight of aromatic amine antioxidant with a melting point of 40° C. or higher and 50 to 300 parts by weight of metal hydroxide are blended into 100 parts by weight of ethylene polymer.

Firstly, additives to ethylene polymer, which are used to prevent radiation deterioration, will now be described in detail.

When ethylene polymer is exposed to ionizing radiation such as a gamma ray, hydrogen is extracted from the polymer even at room temperature and radicals are generated, unlike a case in which the ethylene polymer undergoes ordinary thermal deterioration. Since the radical binds to oxygen, the polymer undergoes oxidative deterioration. It is thought that, as a result, the polymer causes cross linkage and molecular scission and thus the mechanical properties of the resin composition are significantly reduced.

To suppress the deterioration, it was considered important to quickly capture the radicals generated in the polymer. Additives were then systematically studied, leading to a finding that aromatic amine antioxidants with a melting point of 40° C. or higher effectively suppress ethylene polymer from undergoing radiation deterioration of ethylene polymer.

Aromatic amine antioxidants with a melting point of 40° C. or higher include compounds commercially available as antioxidants for rubber and plastics. Examples are monoamine compounds such as diphenylamine compounds, quinoline compounds, and naphthylamine compounds, and other examples are diamine compounds such as phenylenediamine compounds and benzimidazole compounds.

Diphenylamine compounds include: p-(p-toluene sulfonylamido)-diphenylamine (product names: NOCRAC TD from Ouchi Sinko Chemical Industrial Co., Ltd., etc.); 4,4'-α,α-dimethyl benzyl) diphenylamine (product names: NOCRAC CD, Naugard 445 from Shiraishi Calcium Kaisha Ltd., etc.); 4,4'-dioctyl diphenylamine (product names: NOCRAC AD, Antage LDA from Kawaguchi Chemical Industry Co., Ltd., etc.; the abbreviation in JIS is ODPA); and diphenylamine derivatives (product names: NOCRAC ODA-N, Antage OD-P, Antage DDP, etc.).

Quinoline compounds include, e.g., poly 2,2,4-trimethyl-1,2-dihydro quinoline (product names: NOCRAC 224 etc.; the abbreviation in JIS is TMDQ).

Naphthylamine compounds include: phenyl-α-naphthylamine (product names: NOCRAC PA etc.; the abbreviation in JIS is PAN); and N,N'-di-2-naphthyl-p-phenylenediamine (product names: NOCRAC White etc.; the abbreviation in JIS is DNPD).

Phenylenediamine compounds include: N,N'-diphenyl-p-phenylenediamine (product names: NOCRAC DP etc.; the abbreviation in JIS is DPPD); N-isopropyl-N'-phenyl-p-phenylenediamine (product names: Antage 3C, NOCRAC 810NA etc.; the abbreviation in JIS is IPPD); N-phenyl-N'-(3-methacryloyloxy-2-hydroxypropyl)-p-phenylenediamine (product names: NOCRAC G-1 etc.); N-phenyl-N'-(1,3-dimethyl butyl)-p-phenylenediamine (product names: Antage 6C, NOCRAC 6C, etc.); N,N'-di-2-naphthyl-p-phenylenediamine (product names: NOCRAC White etc.; the abbreviation in JIS is DNDP); mixtures including N,N'-diphenyl-p-phenylenediamine (the abbreviation in JIS is DPPD) (product names: NOCRAC 500, Antage DP2, etc.); and diaryl-p-phenylenediamine derivatives or mixtures including them (product names: NOCRAC 630, Antage ST1, etc.).

Benzimidazole compounds include: 2-mercapto benzimidazole (product names: Antage MB etc.; the abbreviation in JIS is MBI); 2-mercaptomethyl benzimidazole (product names: NOCRAC MMB etc.); zinc salt of 2-mercapto benzimidazole (product names: NOCRAC MBZ etc.; the abbreviation in JIS is ZnMBI); and zinc salt of 2-methylmercapto benzimidazole (product names: NOCRAC MMBZ etc.).

A preferable amount of additive is 1 to 30 parts by weight for 100 parts by weight of ethylene polymer. If the amount of additive is less than 1 part by weight, the effect of deterioration prevention in an ionizing radiation environment is small. If the amount exceeds 30 parts by weight, a bloom is prone to occur due to radiation irradiation. A more preferable amount of additive is 2 to 10 parts by weight.

These aromatic amine compounds can be used individually. Alternatively, two or more types of them can be blended. When the melting point of an aromatic amine compound is lower than 40° C., it is liquid even at room temperature and thereby causes bleeding when exposed to ionizing radiation. In addition to the above aromatic amine compounds, mercapto compounds may be used together.

Ethylene polymer includes: as the main component, low-density polyethylene (LDPE), linear low-density polyethylene (LLDPE), linear very low-density polyethylene (VLDPE), high-density polyethylene (HDPE), ethylene-methyl methacrylate (EMMA) copolymer, ethylene methyl acrylate (EMA) copolymer, ethylene ethyl acrylate (EEA) copolymer, ethylene butyl acrylate (EBA) copolymer, ethylene vinyl acetate (EVA) copolymer, ethylene glycidyl methacrylate copolymer, ethylene-butene-1 copolymer, ethylene-butene-hexene terpolymer, ethylene propylene diene terpolymer (EPDM), ethylene-octene copolymer (EOR), ethylene copolymerized polypropylene (random PP or block PP), ethylene propylene (EPR) copolymer, poly-4-methyl-pentene-1, maleic anhydride grafted low-density polyethylene, hydrogenated styrene-butadiene (H-SBR) copolymer, maleic anhydride grafted linear low-density polyethylene, maleic anhydride grafted linear very low-density polyethylene, copolymers of ethylene and α olefine with a carbon number of 4 to 20, ethylene-styrene copolymer, maleic anhydride grafted ethylene-styrene copolymer, maleic anhydride grafted ethylene-methyl acrylate copolymer, maleic anhydride grafted ethylene-vinyl acetate copolymer, ethylene-maleic anhydride copolymer, ethylene-ethyl acrylate-maleic anhydride terpolymer, and ethylene-propylene-butene-1 terpolymer including butene-1. These compounds may be used individually. Alternatively, two or more types of them may be blended.

Of these, EMA, EEA, EBA, and other ethylene-acrylic ester copolymers are preferable because they improve flame retardancy when used with an aromatic amine antioxidant and mercapto compound described later, and EEA is the most preferable. VLDPE, which is polymerized by means of a metallocene catalyst, is also preferable because of its high tensile strength. These types of polymers can be cross-linked according to a usual manner such as addition of sulfur compounds or peroxides, electron irradiation, or silane grafted water cross-linking.

Metal hydroxide flame retardants to be added to ethylene polymer include magnesium hydroxide ($Mg(OH)_2$), aluminum hydroxide ($Al(OH)_3$), hydrotalcite, calcium aluminate hydrate, calcium hydroxide, barium hydroxide, and hard clay. Of these types of flame retardants, magnesium hydroxide has a large flame retardancy effect. Other magnesium hydroxide retardants include synthesized magnesium hydroxide, natural magnesium hydroxide obtained by crushing brucite ores, and solid solutions including Ni (nickel), Zn (zinc), Ca (calcium), or other elements.

From the viewpoints of mechanical properties, ease of dispersion, and flame retardancy, the above metal hydroxides are more preferable when an average particle diameter of the metal hydroxides is 4 µm or less and when a ratio of coarse particles with a particle diameter of 10 µm or more is 10% or less to the total metal hydroxides, the particle diameter being measured with a laser-type particle size distribution measuring instrument. It is also possible to increase water resistance by treating the surfaces of these particles by using fatty acid, fatty acid metal salt, silane coupling agent, titanate coupling agent, acrylate resin, phenol resin, cationic or nonionic water-soluble resin, or the like, according to a usual manner.

A preferable amount of each of the above metal hydroxides to be blended is 50 to 300 parts by weight into 100 parts by weight of ethylene polymer. If the amount is less than 50 parts by weight, sufficient flame detergency cannot be obtained. If the amount is more than 300 parts by weight, the elongation property is significantly reduced.

Of the above aromatic amine compounds, the quinoline compounds and phenylenediamine compounds are preferable because they have superior resistance against gamma rays and other ionizing radiation. The quinoline compounds are most preferable. In addition to the above aromatic amine compounds, mercapto compounds can be more preferably used together; the mechanical property after gamma ray irradiation is improved and the flame retardancy after the irradiation is also improved.

Mercapto compounds include: 2-mercapto benzimidazole (product names: Antage MB etc.; the abbreviation in JIS is MBI); 2-mercaptomethyl benzimidazole (product names: NOCRAC MMB etc.); zinc salt of 2-mercapto benzimidazole (product names: NOCRAC MBZ etc.; the abbreviation in JIS is ZnMBI); zinc salt of 2-mercaptomethyl benzimidazole (product names: NOCRAC MMBZ etc.); 1,3-bis(dimethylaminopropyl)-thiourea (product names: NOCRAC NS-10 etc.); nickel dimethyl dithio carbamate (product names: Sandant TT-NI from Sanshin Chemical Industry Co., Ltd., etc); and nickel dibutyl dithio carbamate (product names: NOCRAC NBC, Sandato NBC, etc.; the abbreviation in JIS is NiBDC). Of these, 2-mercapto benzimidazole is particularly preferable. Mercapto benzimidazole compounds also include aromatic amine in molecules, so they can be said to be complex antioxidants.

A preferable amount of each of the above mercapto compounds to be blended into 100 parts by weight of ethylene polymer is 30 parts or less by weight. When the amount exceeds 30 parts by weight, a blooming is prone to occur due to radiation irradiation. It is more preferable to add the mercapto compounds two to ten times the amount of aromatic amine compound.

When aromatic process oil is added to the above resin compounds, the radiation resistance further increases. The reason for this is unclear, but it can be assumed that polycyclic aromatic compounds, which are included in aromatic process oil molecules, have, e.g., naphthalene rings, anthracene rings, and phenanthrene rings, and thereby stabilize radiation energy by resonance. Although there is no restriction on the amount of addition, 50 parts or less by weight are preferably blended into 100 parts by weight of ethylene polymer. If 50 parts or more by weight are added, a margin in flame retardancy test is reduced.

Carbon elements included in the aromatic process oil are classified into carbon elements in aromatic rings, carbon elements in naphthene rings, and carbon elements in paraffin chains. The more carbon elements are included in the aromatic rings, the more the radiation prevention effect increases. It is preferable that 25 weight percent and more of carbon elements in the aromatic process oil are included in the aromatic rings.

Examples of commercially available process oil are Aroma 790 from Japan Sun Oil Company, Ltd. (the carbon elements in aromatic rings is 36 weight percent), T-DAE from Japan Sun Oil Company, Ltd. (the carbon elements in aromatic rings is 26 weight percent), T-DAE from Nippon Oil Corporation (the carbon elements in aromatic rings is 27 weight percent), Tudalen 65 from Starry Oil Corporation (the carbon elements in aromatic rings is 45 weight percent), and VivaTec 400 from Starry Oil Corporation (the carbon elements in aromatic rings is 27 weight percent).

Additives can be added to these resin compositions, as necessary; the additives include: flame retardancy auxiliary agents, antioxidants, lubricants, surfactants, softeners, plasticizer, inorganic fillers, solubilizing agents, stabilizers, metal chelating agents, bridging agents, ultraviolet absorbents, light stabilizers, coloring agents. Flame retardancy auxiliary agents include: phosphorus flame retardants, silica ketone (polysiloxane) flame retardants, nitrogen flame retardants, boron compounds, and molybdenum compounds.

EXAMPLES

Examples of the present invention will be described with reference to Tables 1 to 3 and FIGS. 1 to 5. However, the present invention is not limited to the examples described herein.

FIG. 1 is a schematic illustration showing a cross-sectional view of an exemplary electric wire to which the present invention is applied. The exemplary electric wire comprises a plurality of copper conductors 1 covered with an insulator 2. The insulator 2 is formed using the inventive radiation-resistant non-halogen flame-retardant resin composition.

Figure 2:
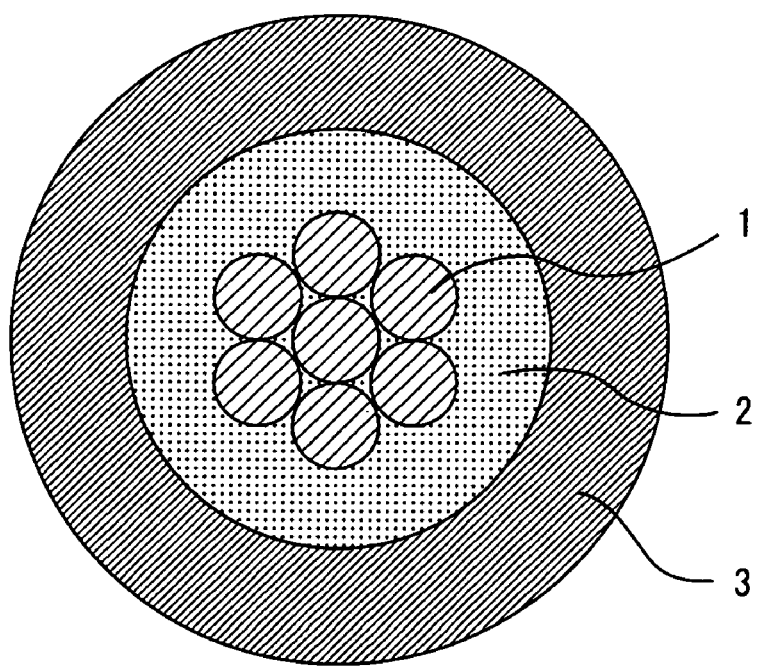
FIG. 2 is a schematic illustration showing a cross-sectional view of an exemplary cable to which the present invention is applied; the cable has an insulated core covered with a sheath.

FIG. 2 is a schematic illustration showing a cross-sectional view of an exemplary cable to which the present invention is applied. The exemplary cable is formed by covering a plurality of copper conductors 1 with an insulator 2 and by performing extrusion coating on the outermost layer to form a sheath 3. Only the sheath 3 or both the sheath 3 and insulator 2 are made of the inventive radiation-resistant non-halogen flame-retardant resin composition.

Figure 3:
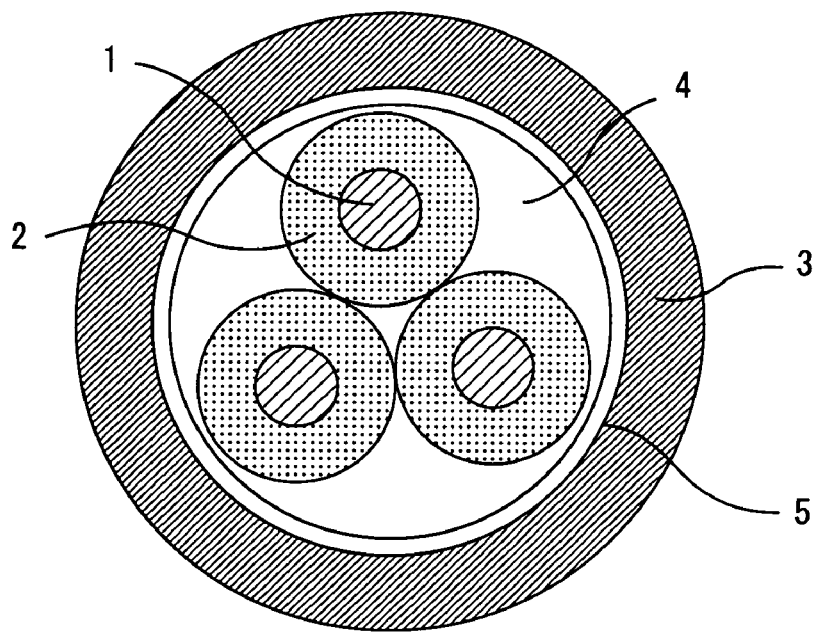
FIG. 3 is a schematic illustration showing a cross-sectional view of another exemplary cable to which the present invention is applied; the cable has three insulated cores stranded, the periphery of which is wound with a tape and then a sheath.

FIG. 3 is a schematic illustration showing a cross-sectional view of another exemplary cable to which the present invention is applied. The another exemplary cable is formed by twisting three cores, each of which is formed by coating a single copper conductor 1 with an insulator 2, together with an interstitial layer 4, by winding the interstitial layer 4 with a tape 5, and by performing extrusion coating on the outermost layer to form a sheath 3. Only the sheath 3 or both the sheath 3 and insulator 2 are formed using the inventive radiation-resistant non-halogen flame-retardant resin composition.

Figure 4:
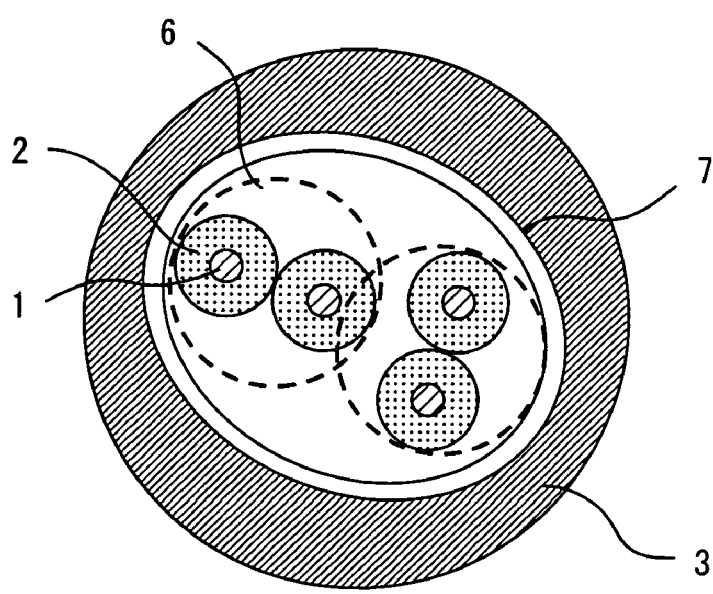
FIG. 4 is a schematic illustration showing a cross-sectional view of another exemplary cable to which the present invention is applied; the cable has two twisted pairs, the periphery of which is wound with a metal shielding layer and then a sheath.

FIG. 4 is a schematic illustration showing a cross-sectional view of another exemplary cable to which the present invention is applied. The another exemplary cable is formed by twisting two cores, each of which is formed by coating a single copper conductor 1 with an insulator 2, to form two twisted pairs 6; the two twisted pairs 6 are covered with a metal shield 7, and extrusion coating is performed on the outermost layer to form a sheath 3. Only the sheath 3 or both the sheath 3 and insulator 2 are made of the inventive radiation-resistant non-halogen flame-retardant resin composition.

Figure 5:
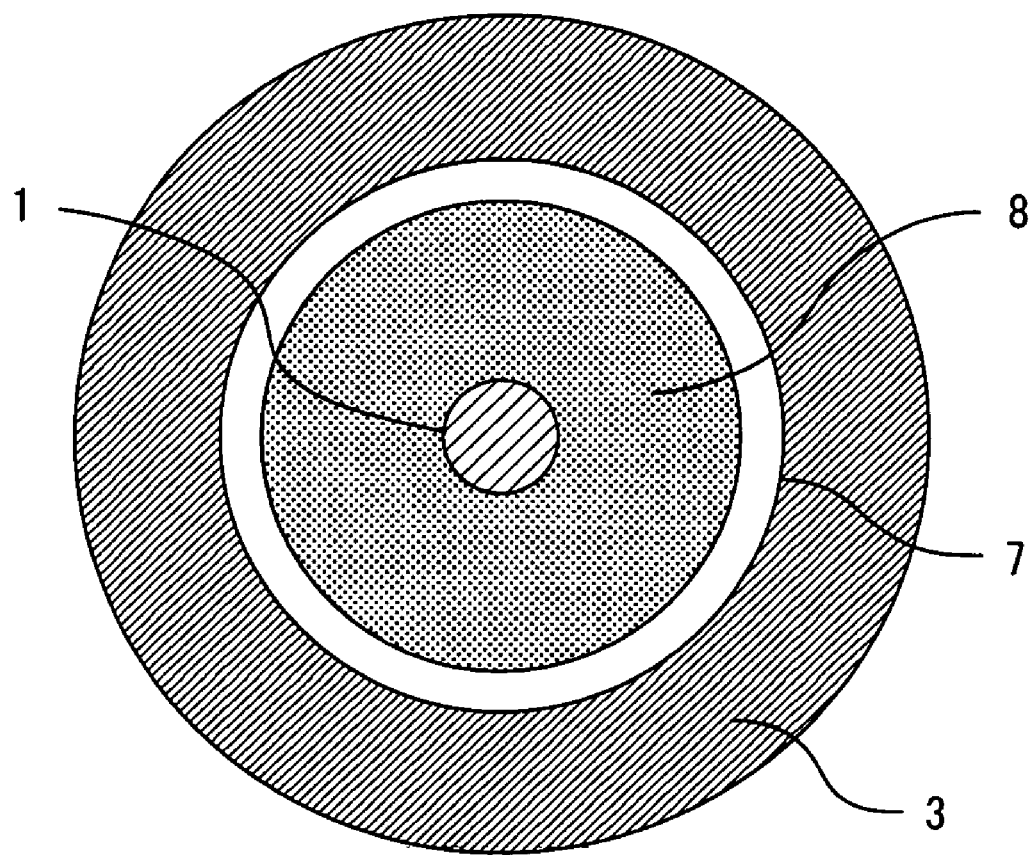
FIG. 5 is a schematic illustration showing a cross-sectional view of an exemplary coaxial cable to which the present invention is applied, the cable has a foamed insulated core covered with a metal shielding layer and then a sheath.

FIG. 5 is a schematic illustration showing a cross-sectional view of an exemplary coaxial cable to which the present invention is applied. The exemplary coaxial cable is formed by coating a single copper conductor 1 with a foam resin insulator 8, by winding the outer periphery of the foam resin insulator 8 with a metal shield 7, and by performing extrusion coating on the outermost layer to form a sheath 3. The sheath 3 is formed using the inventive radiation-resistant non-halogen flame-retardant resin composition.

The resin composition and cables were prepared as described below.

Constituents were blended in the ratios shown in Examples 1 to 26 in Tables 1 and 3, and Comparative examples 1 to 14 in Table 2. A 25 L pressure kneader was used for mixing the constituents at a start temperature of 40° C. and an end temperature of 190° C. The resulting mixture was used to prepare pellets. Using these pellets, a cable sheath with a thickness of 1.5 mm of a 14SQ (14 mm$^2$) cross-linked polyethylene insulated electric wire (thickness of the insulator 2 is 1.0 mm) was extruded at a temperature of 190° C., as shown in FIG. 2.

The cable was evaluated by methods described below.

(1) Tensile Test of Sheath

Tensile test was carried out for the prepared cable sheath, according to JIS C 3005. When the tensile strength (Tb) of the sheath was less than 10 MPa, the sheath was determined to be unsuccessful (denoted x); when the tensile strength was 10 or more MPa, the sheath was determined to be successful (denoted ○).

(2) Radiation Resistance

Gamma rays were irradiated to the prepared cable by 1 MGy at a dose rate of 5 kGy/h, after which tensile test was carried out for the sheath. When the sheath was elongated (elongation: Eb) by less than 50%, it was determined to be unsuccessful (denoted x), when the sheath was elongated by 50% to 200%, it was determined to be successful (denoted ○), and the sheath was elongated by more than 200%, it was determined to be successful with a margin (denoted ◎).

(3) Burning Test

A vertical tray burning test was carried out for the cable to which the gamma rays were irradiated, according to IEEE Standard 383 (1974). When the burning loss distance was more than 180 cm, the cable was determined to be unsuccessful (denoted x); the distance was 130 to 180 cm, the cable was determined to be successful (denoted ○); when the distance was less than 130 cm, the cable was determined to be successful with a margin (denoted ◎).

(4) Visual Check

Surface of the sheath of the cable to which the gamma rays were irradiated was visually checked. When a trace of bleeding or a bloom was found, the cable was determined to be unsuccessful; when the sheath was free from these defects, the cable was determined to be successful.

TABLE 1

| | | Examples | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Polymer (EEA A1150) *1 | | 100 | 100 | 100 | 100 | 100 | 100 | 100 | 100 | 100 | 100 | 100 | 100 | 100 | 100 |
| Flame retardant (magnesium hydroxide) *2 | | 80 | 80 | 80 | 80 | 80 | 80 | 80 | 80 | 80 | 80 | 80 | 80 | 80 | 80 |
| Auxiliary flame retardant (red phosphorus) *3 | | 3 | 3 | 3 | 3 | 3 | 3 | 3 | 3 | 3 | 3 | 3 | 3 | 3 | 3 |
| Antioxidant | Diphenylamine (Naugard 445) *4 | 2 | | | | | | | | | | 2 | | | |
| | Quinoline (NOCRAC 224) *5 | | 1.3 | 2 | 28 | | | | 2 | 2 | | | | 2 | 2 |
| | Naphthylamine (PA) *6 | | | | | 2 | | | | | | | 2 | | |
| | Phenylenediamine (6C) *7 | | | | | | 2 | | | | | | 2 | | 8 |
| | Mercapto benzimidazole (Antage MB) *8 | | | | | | | 2 | 2 | 8 | 8 | 8 | | 28 | |
| | Thiourea (NS10) *9 | | | | | | | | | | | | 2 | | |
| Aromatic process oil (Aroma 790) *10 | | | | | | | | | | | | | | | |
| Coloring agent (carbon black) | | 10 | 10 | 10 | 10 | 10 | 10 | 10 | 10 | 10 | 10 | 10 | 10 | 10 | 10 |
| Initial physical properties | Tb (MPa) | 11.2 | 12.5 | 12.1 | 10.9 | 10.3 | 12.5 | 12 | 11.5 | 11.2 | 10.4 | 10.8 | 10.8 | 10.7 | 10.9 |
| | Eb (%) | 605 | 660 | 610 | 590 | 550 | 620 | 600 | 630 | 610 | 550 | 560 | 570 | 580 | 580 |
| | Decision | ○ | ○ | ○ | ○ | ○ | ○ | ○ | ○ | ○ | ○ | ○ | ○ | ○ | ○ |
| | Decision in burning test | ◎ | ◎ | ◎ | ◎ | ◎ | ◎ | ◎ | ◎ | ◎ | ◎ | ◎ | ◎ | ◎ | ◎ |
| After radiation irradiation (1 MGy) | Eb (%) | 85 | 105 | 140 | 165 | 95 | 125 | 90 | 160 | 180 | 155 | 170 | 80 | 205 | 150 |
| | Decision | ○ | ○ | ○ | ○ | ○ | ○ | ○ | ○ | ○ | ○ | ○ | ○ | ◎ | ○ |
| | Decision in burning test | ○ | ○ | ○ | ○ | ○ | ○ | ○ | ◎ | ◎ | ○ | ◎ | ○ | ◎ | ○ |
| | Visual check | A | A | A | A | A | A | A | A | A | A | A | A | A | A |

*1 Available from Japan Polyethylene Corporation
*2 Kisuma 5L from Kyowa Chemical Industry Co., Ltd.
*3 Available from Rinkagaku Kogyo Co., Ltd.
*4 Available from Shiraishi Calcium Kaisha, Ltd.; melting point is 96° C.
*5 Available from Ouchi Shinko Chemical Industrial Co., Ltd.; melting point is 80° C. to 110° C.
*6 Available from Ouchi Shinko Chemical Industrial Co., Ltd.; melting point is 50° C. or higher.
*7 Available from Kawaguchi Chemical Industry Co,. Ltd.; melting point is 44° C. or higher.
*8 Available from Kawaguchi Chemical Industry Co,. Ltd.; melting point is 280° C. or higher.
*9 Available from Ouchi Shinko Chemical Industrial Co., Ltd.; no melting point, powder.
*10 Available from Japan Sun Oil Company, Ltd.
A: Superior

TABLE 2

| | | | Comparative examples | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Polymer (EEA A1150) *1 | | | 100 | 100 | 100 | 100 | 100 | 100 | 100 | 100 | 100 | 100 | 100 | 100 | 100 | 100 |
| Flame retardant (magnesium hydroxide) *2 | | | 80 | 80 | 80 | 80 | 80 | 80 | 80 | 80 | 80 | 80 | 80 | 80 | 45 | 350 |
| Auxiliary flame retardant (red phosphorus) *3 | | | 3 | 3 | 3 | 3 | 3 | 3 | 3 | 3 | 3 | 3 | 3 | 3 | 3 | 3 |
| Antioxidant | Phenol | Irganox 1010 *11 | | 2 | | | | | | | | | | | | |
| | | DAH *12 | | | 2 | | | | | | | | | | | |
| | | NS7 *13 | | | | 2 | | | | | | | | | | |
| | | Irganox 565 *14 | | | | | 2 | | | | | | | | | |
| | Quinoline | NOCRAC 224 *5 | | | | | | | | | | | 0.7 | 32 | 2 | 2 |
| | | AW: liquid *15 | | | | | | 2 | | | | | | | | |
| Diphenylamine (OD: liquid) *16 | | | | | | | | | 2 | | | | | | | |
| Hindered amine (JF90) *17 | | | | | | | | | | 2 | | | | | | |
| Hydrazide (isophthalic acid di-hydrazide) *18 | | | | | | | | | | | 2 | | | | | |
| Thio ether (Seenox 412S) *19 | | | | | | | | | | | | 2 | | | | |
| Mercapto benzimidazole (Antage MB) *8 | | | | | | | | | | | | | | | 8 | 8 |
| Aromatic process oil (Aroma 790) *10 | | | 10 | 10 | 10 | 10 | 10 | 10 | 10 | 10 | 10 | 10 | 10 | 10 | 10 | 10 |
| Coloring agent (carbon black) | | | 10 | 10 | 10 | 10 | 10 | 10 | 10 | 10 | 10 | 10 | 10 | 10 | 10 | 10 |
| Initial physical properties | | Tb (MPa) | 13.4 | 10.2 | 10.7 | 10.4 | 11.5 | 9.5 | 9.2 | 11 | 9.5 | 12.6 | 12.2 | 10.8 | 13.5 | 8.7 |
| | | Eb (%) | 580 | 530 | 560 | 620 | 520 | 610 | 620 | 540 | 480 | 490 | 630 | 550 | 660 | 280 |
| | | Decision | ○ | ○ | ○ | ○ | ○ | X | X | ○ | X | ○ | ○ | ○ | ○ | X |
| | | Decision in burning test | ◎ | ◎ | ◎ | ◎ | ◎ | ◎ | ◎ | ◎ | ◎ | ◎ | ◎ | ◎ | X | ◎ |
| After radiation irradiation (1 MGy) | | Eb (%) | 20 | 30 | 25 | 26 | 24 | 60 | 65 | 35 | 25 | 30 | 45 | 160 | 180 | 15 |
| | | Decision | X | X | X | X | X | ○ | ○ | X | X | X | X | ○ | ○ | X |
| | | Decision in burning test | X | X | X | X | X | X | X | X | X | X | X | ○ | X | ◎ |
| | | Visual check | A | A | A | A | A | B | B | A | A | A | A | C | A | A |

*11, 14 Available from Chiba-Geigy KK.
*12, 13 Available from Ouchi Shinko Chemical Industrial Co., Ltd.
*15 Available from Ouchi Shinko Chemical Industrial Co., Ltd.; melting point is 35° C. or lower.
*16 Available from Kawaguchi Chemical Industry Co,. Ltd.; melting point is 35° C. or lower.
*17 Available from Johoku Chemical Co., Ltd.; melting point is 80° C. or higher.
*18 Available from Otsuka Chemical Co., Ltd.; melting point is 210° C. or higher.
*19 Available from Shipro Kasei Kaisha, Ltd.; melting point is 44° C. or higher.
A: Superior B: Bleeding C: Blooming

TABLE 3

| | | Examples | | | | | | | | | | | |
|---|---|---|---|---|---|---|---|---|---|---|---|---|---|
| | | 15 | 16 | 17 | 18 | 19 | 20 | 21 | 22 | 23 | 24 | 25 | 26 |
| Polymer | EEA A1150 *1 | 100 | 100 | 100 | 100 | 100 | 100 | 100 | 70 | 70 | 70 | 100 | 100 |
| | VLDPE *20 | | | | | | | | 30 | 30 | 30 | | |
| Flame retardant (magnesium hydroxide) *2 | | 80 | 80 | 80 | 80 | 80 | 80 | 80 | 80 | 80 | 80 | 50 | 300 |
| Auxiliary flame retardant (red phosphorus) *3 | | 3 | 3 | 3 | 3 | 3 | 3 | 3 | 3 | 3 | 3 | 3 | 3 |
| Antioxidant | Diphenylamine (Naugard 445) *4 | 2 | | | | | | | | | | | |
| | Quinoline (NOCRAC 224) *5 | | 2 | | | 2 | 2 | 2 | 2 | 2 | 2 | 2 | 2 |
| | Naphthylamine (PA) *6 | | | | | | | | | | | | |
| | Phenylenediamine (6C) *7 | | | | 2 | | | | | | | | |
| | Mercapto benzimidazole (Antage MB) *8 | | | | | 8 | 8 | 8 | 8 | 8 | 8 | 8 | 8 |
| | Thiourea (NS10) *9 | | | | | | | | | | | | |
| Aromatic process oil (Aroma 790) *10 | | 10 | 10 | 10 | 5 | 10 | 50 | 55 | 5 | 10 | 50 | | |
| Coloring agent (carbon black) | | 10 | 10 | 10 | 10 | 10 | 10 | 10 | 10 | 10 | 10 | 10 | 10 |
| Initial physical properties | Tb (MPa) | 10.5 | 11.4 | 11.3 | 11.3 | 11 | 10.5 | 10.1 | 12.8 | 12.2 | 11.6 | 14.2 | 10.2 |
| | Eb (%) | 650 | 660 | 645 | 650 | 650 | 660 | 670 | 670 | 660 | 670 | 720 | 470 |
| | Decision | ○ | ○ | ○ | ○ | ○ | ○ | ○ | ○ | ○ | ○ | ○ | ○ |
| | Decision in burning test | ◎ | ◎ | ◎ | ◎ | ◎ | ◎ | ◎ | ◎ | ◎ | ◎ | ○ | ◎ |
| After radiation irradiation (1 MGy) | Eb (%) | 140 | 175 | 145 | 210 | 330 | 380 | 390 | 250 | 370 | 410 | 220 | 90 |
| | Decision | ○ | ○ | ○ | ◎ | ◎ | ◎ | ◎ | ◎ | ◎ | ◎ | ◎ | ○ |
| | Decision in burning test | ○ | ○ | ○ | ◎ | ◎ | ◎ | ○ | ○ | ◎ | ◎ | ◎ | ◎ |
| | Visual check | A | A | A | A | A | A | A | A | A | A | A | A |

*20 Available from Sumitomo Chemical Co., Ltd., Excellen FX, metallocene catalytic polymerization, specific gravity of 0.890.
A: Superior When aromatic amine antioxidants (diphenylamine, quinoline, naphthylamine, phenylenediamine, and benzimidazole) in Examples 1 to 7 in Table 1 were added, the initial physical properties and all properties after radiation irradiation at 1 MGy were superior. In particular, the radiation resistance of quinoline in Examples 2 to 4 and phenylenediamine in Example 6 exhibited superior results.

By contrast, when any one of a phenol antioxidant (in Comparative examples 1 to 5), a liquid quinoline antioxidant (in Comparative example 6), a liquid diphenylamine antioxidant (in Comparative example 7), a hindered amine antioxidant (in Comparative example 8), a hydrazide antioxidant (in Comparative example 9), and a thio ether antioxidant (in Comparative example 10) described in Table 2 was added to a resin composition, elongation (Eb) after radiation irradiation or flame retardancy was unsuccessful. For the liquid compounds in Comparative examples 6 and 7, bleeding occurred on the cable surface after irradiation. In Comparative example 11, in which the amount of addition was less than a prescribed value, the effect to improve radiation resistance was smaller than that in Example 3, and elongation after irradiation was unsuccessful. In Comparative example 12, in which the amount of addition was greater than the prescribed value, a blooming occurred on the cable surface after irradiation.

In Examples 8 to 11, in which an aromatic amine antioxidant and a mercapto compound were used together, the radiation resistance was further improved when compared with Example 12 in which different types of aromatic amine compounds were used together. In particular, in Examples 8, 9 and 11, in which a quinoline or phenylenediamine antioxidant and a mercapto compound were added together, reduction in flame retardancy after gamma ray irradiation was also prevented.

In Examples 15 to 21 in Table 3, in which an aromatic amine antioxidant and aromatic process oil were blended, elongation after gamma ray irradiation was significantly improved when compared with, e.g., Examples 1, 3 and 6. In Examples 18 to 21, different amounts of aromatic process oil were added; the flame retardancy in Examples 18 to 20, in which 50 parts or less by weight were added, was higher than the flame retardancy in Example 21, in which 55 parts by weight were added.

In Examples 22 to 24, in which EEA and VLDPE were blended as ethylene polymer, the sheath tensile strength and elongation after radiation irradiation were improved when compared with those in Examples 18 to 20, in which only EEA was used.

Comparing between Example 25 and Comparative example 13, it is found that flame retardancy becomes unsuccessful when the amount of added metal hydroxide is less than the prescribed value. Comparing among Examples 25 and 26 and Comparative examples 13 and 14, it is also found that the mechanical property becomes unsuccessful when the amount of added metal hydroxide is more than the prescribed value.

The sizes and structures of the electric wire and cable are not limited to 14SQ employed in the present invention; the present invention is applicable to electric wires and cables having any sizes and any structures. The insulator or sheath can be cross-linked by addition of organic peroxide, electronic beam irradiation, or another chemical reaction, if necessary.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A radiation-resistant non-halogen flame-retardant resin composition, comprising: one to 30 parts by weight of at least one aromatic amine antioxidant with a melting point of 40° C. or higher selected from the group consisting of
a quinoline antioxidant and a phenylenediamine antioxidant and 50 to 300 parts by weight of metal hydroxide blended into 100 parts by weight of ethylene polymer.

2. The radiation-resistant non-halogen flame-retardant resin composition according to claim 1, further comprising: 30 parts or less by weight of mercapto compound blended into said 100 parts by weight of ethylene polymer.

3. The radiation-resistant non-halogen flame-retardant resin composition according to claim 1, further comprising: aromatic process oil.

4. The radiation-resistant non-halogen flame-retardant resin composition according to claim 1, wherein:
the ethylene polymer is an ethylene—acrylic ester copolymer.

5. An electric wire, comprising: an insulating material made of the radiation-resistant non-halogen flame-retardant resin composition according to claim 1.

6. A cable, comprising: a sheath made of the radiation-resistant non-halogen flame-retardant resin composition according to claim 1.

7. An electric wire in a particle accelerator facility, nuclear power plant, or nuclear reprocessing facility, comprising: an insulating material made of the radiation-resistant non-halogen flame-retardant resin composition according to claim 1.

8. A cable in a particle accelerator facility, nuclear power plant, or nuclear reprocessing facility, comprising: a sheath made of the radiation-resistant non-halogen flame-retardant resin composition according to claim 1.

9. The radiation-resistant non-halogen flame-retardant resin composition according to claim 1, wherein the at least one aromatic amine antioxidant is present in an amount of 2 to 10 parts by weight.

* * * * *